United States Patent [19]

Kramer

[11] 4,321,630
[45] Mar. 23, 1982

[54] LINEAR INTEGRATING CAVITY LIGHT COLLECTOR

[75] Inventor: Charles J. Kramer, Pittsford, N.Y.

[73] Assignee: Xerox Corporation, Stamford, Conn.

[21] Appl. No.: 183,134

[22] Filed: Sep. 2, 1980

[51] Int. Cl.³ .............................................. H04N 1/24
[52] U.S. Cl. .................................. 358/294; 250/228; 358/293
[58] Field of Search ................ 358/294, 293; 250/216, 250/228, 237 R, 578

[56] References Cited

U.S. PATENT DOCUMENTS

| | | | |
|---|---|---|---|
| 2,945,958 | 7/1960 | Morris | 250/230 |
| 3,455,637 | 7/1969 | Howard | 356/434 |
| 3,561,846 | 2/1971 | Kingsland | 250/228 |
| 3,603,730 | 9/1971 | Weigl et al. | 358/294 |
| 3,681,527 | 8/1972 | Nishiyama et al. | 358/294 |
| 3,845,239 | 10/1974 | Granzow et al. | 358/286 |
| 3,980,893 | 9/1976 | Merlen | 250/572 |
| 3,987,301 | 10/1976 | O'Connor | 250/227 |
| 4,001,581 | 1/1977 | Murata | 250/239 |
| 4,012,585 | 3/1977 | Chen | 358/285 |
| 4,015,081 | 3/1977 | Starkweather | 358/206 |
| 4,180,702 | 12/1979 | Sick et al. | 250/227 |

FOREIGN PATENT DOCUMENTS

| | | |
|---|---|---|
| 2102 | 5/1979 | European Pat. Off. . |
| 2653230 | 7/1977 | Fed. Rep. of Germany . |

*Primary Examiner*—Howard Britton

[57] ABSTRACT

A light collector for collecting light reflected from an information bearing surface and scanned by a flying spot scanner. The collector comprises an integrating cavity having at least one photodetector therein with at least one slit like aperture for receiving light reflected from the information bearing surface. In a first embodiment, a scan beam passes through the cavity via a first and second slit to scan essentially normal to the surface. Reflected light is directed back into the cavity and is apodized to improve signal level uniformity at the photodetector. The cavity construction is also designed to provide start and end of scan signals.

17 Claims, 10 Drawing Figures

LINEAR INTEGRATING CAVITY LIGHT COLLECTOR

This invention relates to a light collector for collecting light reflected from an information bearing surface and more particularly to a light collector in the form of a hollow cylindrical integrating cavity.

There are a number of present systems in the telecommunication, facsimile and xerographic areas wherein information content on an original document member is scanned by a flying spot beam; and the light reflections therefrom converted to analog image signals representative of the information being scanned. One conversion method utilizes a light collector disposed adjacent the original document to gather or collect the scattered and reflected light emanating from the document surface. A similar technique is used to scan and detect developed toner images on a photoconductive surface.

While light collectors may take various forms, a preferred type, because of its small size and relatively low cost, is a transparent rod. However, the light collection efficiency of a rod is so low as to effectively rule out use of this device. Attempts to improve the collection efficiency of rod-type collectors by applying various reflective or opaque coatings to the exterior thereof has resulted in some improvement. Still, despite modifications and improvements, the collection efficiency of rod-type collectors remains marginal.

This invention relates to a collector for collecting light reflected from an information bearing surface, the collector comprising: a generally cylindrical, hollow integrating cavity having at least one longitudinally extending slit therein, said cavity disposed relative to said scanned surface so that light reflected from said scanned surface enters said cavity through said slit; at least one photodetector element placed within said cavity to produce a signal level representative of the scanned information and apodizing means to improve the uniformity of said signal level.

While the present invention is useful in any telecommunication system which scans and detects information on a surface, the following description is directed to the use of a light collector in a multi-mode reproduction apparatus. This apparatus is operable selectively in a COPY mode to xerographically make copies of original documents in the manner typical of xerographic copiers or machines, in a WRITE mode to xerographically produce copies from image signals input thereto using a flying spot type scanner, and in a READ mode to read images developed on the machine photoreceptor with the same flying spot scanner to produce image signals representative thereof and thereby convert the image to electronic signals.

Figure 1:
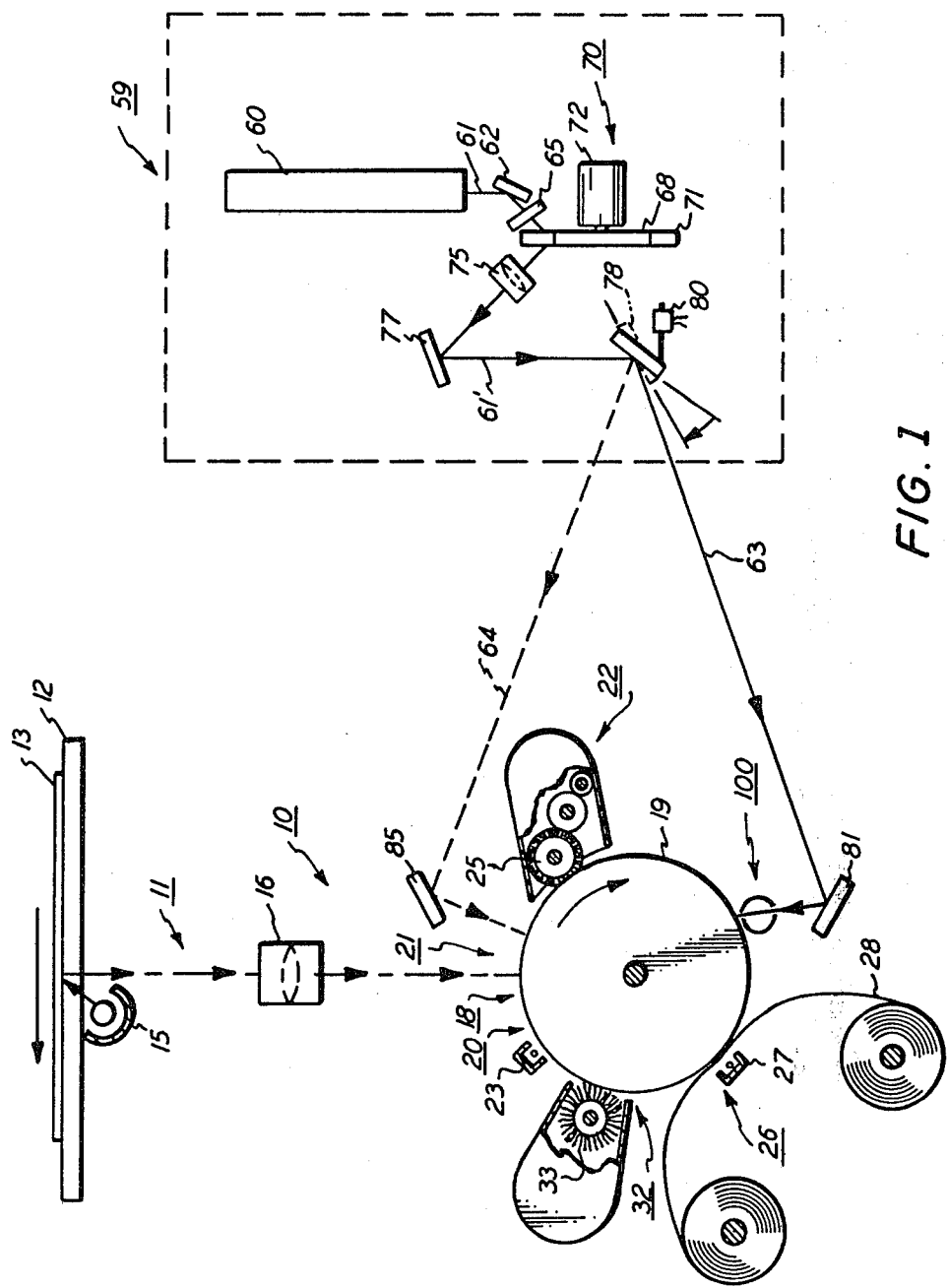
FIG. 1 is a schematic view showing an exemplary apparatus for carrying out multiple function image processing incorporating the improved light collector of the present invention.

Referring now to FIG. 1 of the drawings, there is shown an exemplary xerographic type reproduction apparatus 10 incorporating the present invention. Xerographic reproduction apparatus 10 includes a viewing station or platen 12 where document originals 13 to be reproduced or copied are placed. For operation in the COPY mode as will appear more fully herein, a light/lens imaging system 11 is provided, the light/lens system including a light source 15 for illuminating the original 13 at platen 12 and a lens 16 for transmitting image rays reflected from the original 13 to the photoconductive surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example comprise a magnetic brush 25, is provided at developing station 22 for developing the latent electrostatic images created on drum 18.

At transfer station 26, corona transfer means 27 effects transfer of the developed image to a suitable copy substrate material 28. A suitable drum cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted.

In the example shown, photoconductive surface 19 comprises a uniform layer of photoconductive material such as amorphous selenium on the surface of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated other photoconductor types such as belt, web, etc. may be envisioned. Photoconductive materials other than selenium, as for example, organic may also be contemplated. And while a scan type imaging system is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render drum 18 wholly or partially transparent. One material consists of an aluminized mylar substrate having a layer of selenium dispersed in poly-N-vinyl carbazole with a transparent polymer overcoating containing a charge transport compound such as pyrene.

Xerographic reproduction apparatus 10 includes a flying spot scanner 59. Scanner 59 has a suitable flux source of electro-magnetic radiation such as laser 60. The collimated beam 61 of monochromatic radiation generated by laser 60 is reflected by mirror 62 to a modulator 65, which for operation in the WRITE MODE, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61.

Beam 61 is diffracted by disc deflector 68 of a holographic deflector unit 70. Deflector 68 comprises a substantially flat disc-like element having a plurality of grating faces or facets 71 forming the outer periphery thereof. Deflector 68 which is preferably glass, is driven by motor 72. Preferably, deflector 68 is disposed so that light beam 61 is incident to the facets 71 thereof at an angle of substantially 45°. The diffracted scanning beam 61' output by deflector 68 exits at a complementary angle.

The scanning beam 61' output by deflector 68 passes to an imaging lens 75. As shown, lens 75 is located in the optical path between deflector 68 and mirror 77, lens 75 being of a diameter suitable to receive and focus the scanning light beam diffracted by facets 71 of deflector 68 to a selected spot in the focal plane proximate the surface 19 of drum 18, as will appear.

The scanning beam 61' from lens 75 is reflected by mirror 77 to read/write control mirror 78, which in turn, reflects the beam to provide selectively image READ beam 63 (shown by solid line in FIG. 1) or image WRITE beam 64 (shown by dotted line in FIG. 1). Image READ beam 63 passes directly through collector 100, after reflection by mirror 81 to a location on the surface 19 of drum 18 downstream of developer 22, while image WRITE beam 64 is reflected by mirror 85 to a location on surface 19 upstream of developer 22.

In the case where the photoconductive material is opaque, light impinging on the surface 19 of drum 18 is scattered. In the case where the photoconductive material is transparent, the light is transmitted, depending on the degree of transparency of the photoconductive material through the photoconductive material to the drum interior. As will be understood, scattered light is composed of both specular and diffuse reflected light while transmitted light is composed of specular and diffuse transmitted light. The scattered or transmitted light from the photoconductive surface 19 of drum 18 and the developed image thereon is collected in collector 100, and there converted to image signals, in a manner described in detail below.

Read/write control mirror 78 is supported for limited movement between a READ position (shown in solid line in the drawing) and a WRITE position (shown in dotted line in the drawing). A suitable driving mechanism such as solenoid 80 is provided to selectively move the mirror 78 from one position to the other. Return spring means (not shown) may be provided to return mirror 78 to the original position upon deenergization of solenoid 80.

OPERATION

In the COPY mode, latent electrostatic images are formed on the photoconductive surface 19 of drum 18 through exposure of the document 13 on platen 12 as described heretofore. In the WRITE mode, latent electrostatic images are created on the charged photoconductive surface 19 of drum 18 by means of the flying spot scanner 59 in accordance with image signals input thereto. In this mode, solenoid 80 is energized to move control mirror 78 to the WRITE position (the dotted line position shown in FIG. 1). In this position, mirrors 78, 85 cooperate to provide image WRITE beam 64 at a point on the surface 19 of drum 18 upstream of developing station 22. Modulator 65 modulates the light intensity of beam 64 in accordance with the content of the image signals input thereto so that image WRITE beam 64 dissipates the electrostatic charge on the drum surface to create a latent electrostatic image representative of the image signals input thereto as beam 64 scans thereacross. The electrostatic latent image so created is thereafter developed by magnetic brush 25 and transferred to copy substrate material 28 by corona transfer means 27 at transfer station 26. Following transfer, the surface of drum 18 is cleaned by cleaning brush 33 as described.

In this mode, and in the image READ mode described below, deflector 68 is continually driven at substantially constant velocity by motor 72. In the WRITE mode, the image signal source is controlled so as to be synchronized with rotation of deflector 68. The rotational rate of xerographic drum 18 which determines the spacing of the scan line, is preferably synchronized to the signal source in order to maintain image linearity.

In the image READ mode, where it is desired to read original 13 and convert the content thereof to image signals, solenoid 80 is deenergized to place control mirror 78 in the READ position (the solid line position shown in FIG. 1). In this position, mirror 78 cooperates with mirror 80 to provide image READ beam 63 on the surface 19 of drum 18 at a point downstream of developing station 22, beam 63, after reflection from mirror 81, scanning across the surface of drum 18 and any image developed thereon.

In this mode, a latent electrostatic image of the original 13 on platen 12 is created on the surface 19 of drum 18 through exposure of the original 13 and subsequent development by magnetic brush 25 in the manner described heretofore. As the developed image is carried on drum 18 from developing station 22 to transfer station 26, the image is scanned line by line by image READ beam 63. The light is reflected from the photoconductive surface 19 in accordance with the presence or absence of toner on the drum surface, the reflected light being picked up by collector 100 and converted to image signals as will appear hereinafter. As will be understood where the light beam strikes toner, the light is absorbed and no light is reflected. Where the light beam strikes uncovered portions of the photoconductive surface 19 of drum 18, the light is scattered and reflected back by the photoconductive surface collector 100. The presence or absence of light is sensed by collector 100 which provides an analog image signal representative of the developed image scanned as will appear. Image signals generated by collector 100 may be used to produce additional copies of the original 13, or stored, or transmitted to a distant point, etc.

Following scanning, the developed image on drum 18 may be transferred to substrate material 28 in the manner described heretofore. Alternately, transfer may be dispensed with and the drum surface cleaned by cleaning brush 33.

Figure 2:
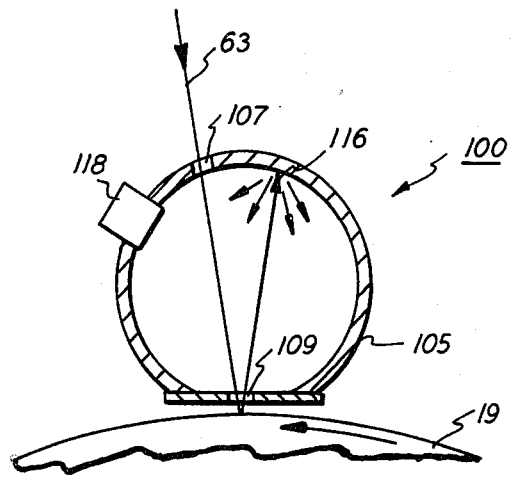
FIG. 2 is a cross-sectional end view of a first embodiment of the light collector shown in FIG. 1.
Figure 3:
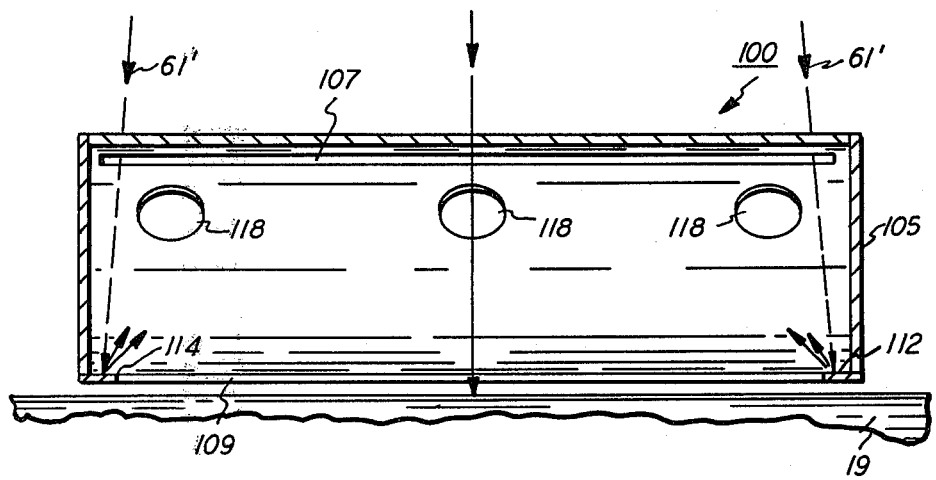
FIG. 3 is a cross-sectional side view of the light collector shown in FIG. 1.

Referring particularly to FIGS. 2 and 3, collector 100 consists of elongated hollow cylindrical housing 105 disposed adjacent and in predetermined spaced relationship to the surface 19 of drum 18. The interior walls of the collector have substantially diffuse reflecting surfaces resulting from coating the wall with a high reflectivity material such as Celanese polyester thermal setting paint #741-13 or Glidden Enamel #424-W-02100 in cellosolve acetate thinner. The collector therefore approximates an integrating cavity and operates at the increased illumination efficiency characteristic of such a construction. Housing 105 is supported (by means not shown) so that its longitudinal axis is substantially parallel to the axis of drum 18. Housing 105 is provided with a first elongated slit-like aperture 107 through which READ beam 63 enters. The beam exits the cavity through a second slit-like aperture 109 and is reflected from the drum surface to re-enter the housing through scan slit 109. End portions 112, 114 are located at the extreme ends of slit 109 for purposes more fully described below. Beam 63, upon re-entry into the collector, is first incident on a strip 116 which runs parallel to entrance slit 107. The reflectivity of this strip has been altered by an apodization process for purposes which will be more fully described below. Photodetectors 118 are provided along the inside wall of housing 105 in a longitudinal direction. Light which is reflected from strip 116, and further reflected by internal reflection, is sensed by photodetectors 118. The photodetectors then generate analog image signals in response to the presence or absence of light.

Figure 4A:
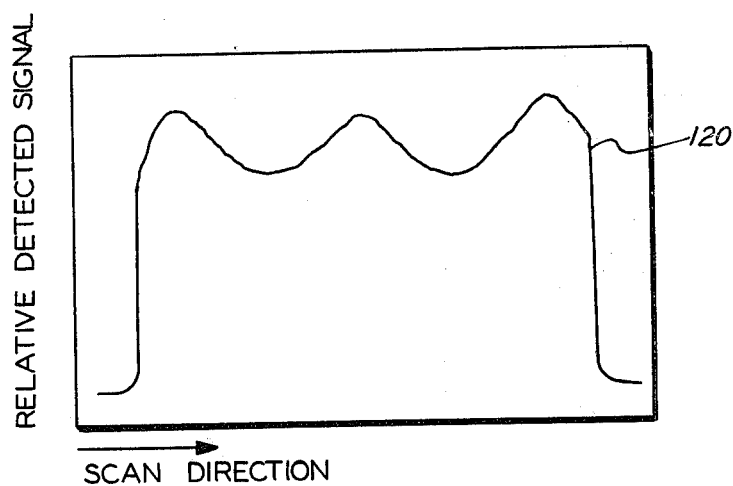
FIG. 4 is an oscilloscope trace showing an apodizided and unapodized response for non-information bearing scanned surface.
Figure 4B:
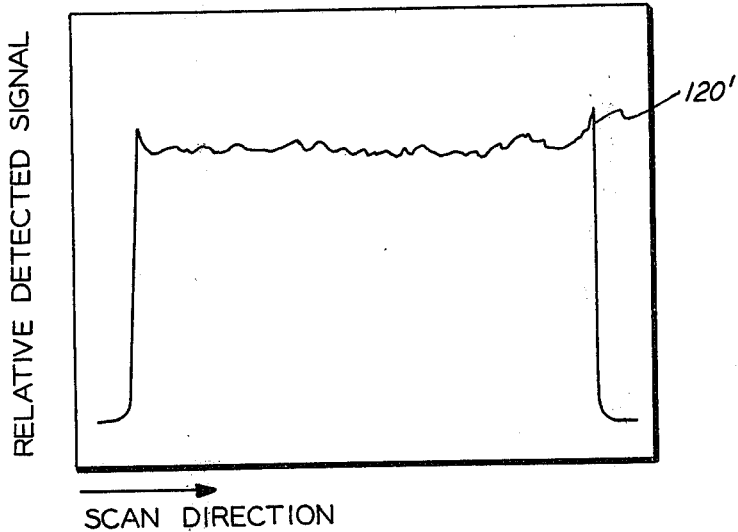

In operation, as a portion of a developed image on surface 19 passes beneath cavity 100, the image is scanned by READ beam 63. The beam, scanning from right to left in FIG. 3, first strikes end portion 112 and generates the first signal detected by the photodetectors 118. Due to the high reflectivity of this surface the signal generated will be at a high level relative to the subsequent reflection from the toned image on the drum. This first signal can therefore be used as a start of scan signal. This signal could be used to trigger a timing circuit which would synchronize the photodetector output with the position of the scanning beam. Thereafter, during the scan cycle, beam position information is accurately maintained. As the beam progresses in the scan direction, the incident beam strikes the photoreceptor essentially normally thereby maintaining scanning beam symmetry. The light from beam 63 is reflected back through slit 109 in accordance with the presence or absence of toner, i.e. where the light beam strikes toned areas, the light is absorbed, whereas where the light beam strikes the untoned portions of the surface, the light is reflected. This first component of reflected light is incident on strip 116. The reflectivity of this strip is of key importance since it directly influences the cavity response. According to one aspect of the invention, it was perceived that if the reflectivity of strip 116 were selectively altered, compensation could be provided for nonuniformity of signal level resulting from cavity geometry and position of the photodetectors 118. This use of a variable density coating to modify a reflection pattern is often referred to as apodization. FIG. 4a shows an oscilloscope trace 120 of a cavity response to the scan of a nontoned area of surface 19 with strip 116 unapodized. A non-uniform response is present with the peaks in the trace corresponding to the position of the photodetectors. FIG. 4b shows oscilloscope trace 120' which is the cavity response with strip 116 apodized to improve the uniformity. The apodization would take the form of varying the density along strip 116 with the areas of strip 116 proximate photodetector location being of greater density and areas between detector positions of less density. This pattern serves to "level" the peaks of trace 120 producing trace 120' of FIG. 4b.

Apodization can be achieved by a variety of techniques. A preferred method is to produce the desired density variation photographically on reflecting strip 116 and then attaching the strip to the cavity wall. The photographic technique can include a positive print or a negative transparency. The desired apodization could also be achieved by placing a variable transmission filler over either slit 107 or 109. This method, however, changes the intensity of the scanning beam. Another less exact technique which may be suitable for some systems is to paint the desired pattern using different reflecting paints.

As beam 63 reaches the end of scan, it strikes end portion 114 generating the same level signal as when striking portion 112. This signal can be used as an end of scan signal.

Referring again to FIG. 3, it is possible to achieve better beam position information and/or instantaneous scan beam velocity by encoding end portions 112, 114. One type of code that could be used is to form a bar pattern of fixed frequency on each portion. As the end portions are scanned, a periodic signal is produced which is then used to determine scan velocity and position. A center of beam detection system could be constructed by monitoring the intensity variations as the beam scans across a single black bar.

Figure 5:
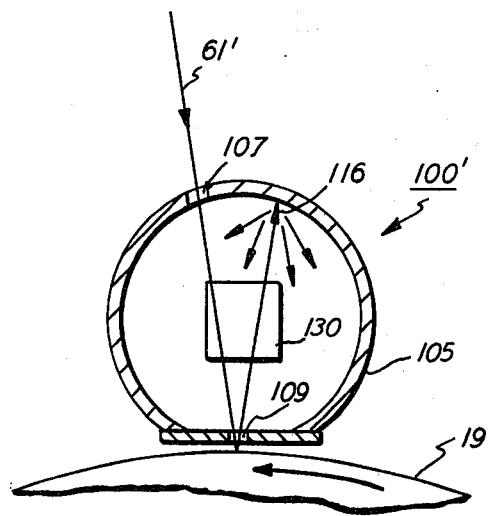
FIG. 5 is a cross-sectional view of a second embodiment of the light collector shown in FIG. 1.
Figure 6:
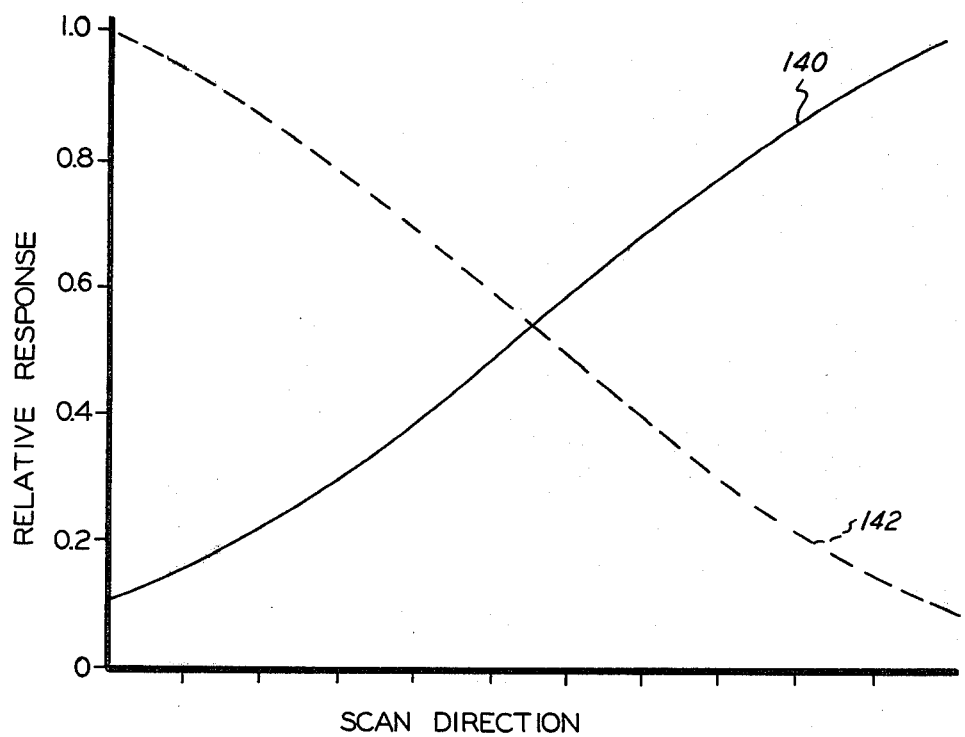
FIG. 6 shows a system response curve for the FIG. 5 embodiment.

FIG. 5 shows a second embodiment of a light collector 100' which is similar in construction to collector 100 except that a single photodetector 130 is placed at one end of the cavity. The photodetector in this embodiment is a photomultiplier tube (PMT), but a pin diode, or the like, can also be used. FIG. 6 shows the system response curve 140 for this type of system as well as the apodization curve 142 needed to produce a uniform system response. Besides utilizing the previously described passive apodization techniques, real time active techniques can also be used. For example, scanner 59 can be modified to alter the intensity of READ beam 63 with time. This requires the beam intensity to be gradually reduced during the scan. The modification could also be performed on the output of photodetector 130 by use of a voltage controlled amplifier stage (not shown). The previously described technique for detecting start and end of scan could be used to determine the compensation levels at these points.

The signal level of the FIG. 5 embodiment could also be made more uniform by a non-apodization technique. A field lens (not shown) of appropriate focal length could be placed in front of detector 130. The lens functions as a condenser and directs rays which originates from the end of the cavity opposite detector 130 onto the detector while having little effect on rays which originate near the detector end of the cavity. With this arrangement, it is expected that the non-uniformity would be reduced by the ratio of the area of the lens to the area of the detector cathode. It may be advantageous in some cases to mask down the cathode to improve this ratio.

The light collectors disclosed above have a number of desirable characteristics. By placing the cavity close to the information-bearing surface and having the incident beam pass through the cavity before striking the surface large numerical apertures in the order of 0.5 in the cross scan directions and 1.0 in the scan direction are possible. Because of the integrating cavity design, high efficiency in light collection result in large signal to noise ratio in the order of 100:1. This design also allows the incident beam to land essentially normal to the information bearing surface and thereby maintain scanning beam symmetry. By a slight change in construction at the ends of the cavity, the beam can also be used to produce start and end of scan signals. The cavity construction also favors simple apodization techniques to also provide signal uniformity.

Figure 7:
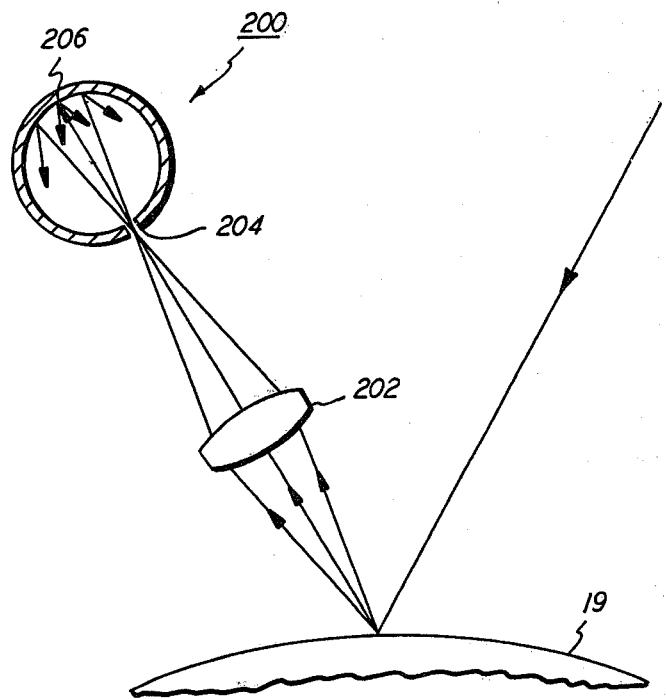
FIG. 7 is a third embodiment of a light collector.

Although the above embodiments have shown a dual slit cavity, the apodization techniques are useful in single slit systems wherein the scan beam comes in at some angle and is reflected from the scanned surface into the cavity through a single slit. FIG. 7 shows a third embodiment of the invention wherein collector 200 is placed at a sufficient distance from photoreceptor surface 19 such that a cylinder lens 202 can be interposed between the collector and the surface. In this embodiment READ beam 63 is deflected by a second mirror (not shown) so as to strike the photoreceptors 18 at a position downstream to the position shown. The cross-scan beam is then reflected from the surface, focused by lens 202 so that it passes through entrance slit 204 and is incident on apodizing strip 206. The photodetector arrangement within collector 200 is similar to the configuration shown in FIG. 3. This embodiment also maintains the desirable characteristics described above.

Figure 8:
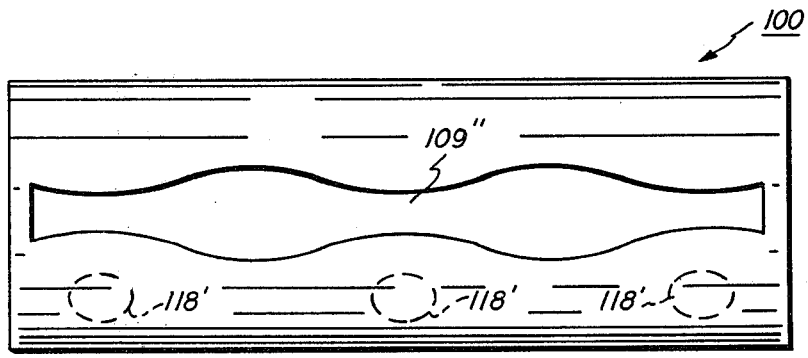
FIG. 8 is a view of the collector of FIG. 2 with a modified slit aperture.
Figure 9:
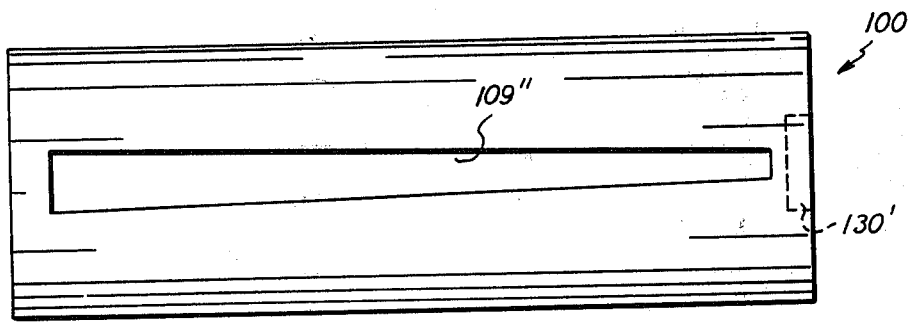
FIG. 9 is a view of the collector of FIG. 5 with a modified slit aperture.

In the embodiments described above, the light has been reflected from the generally specular surface of the photoconductor. In those systems where the scanning is of a document, the paper surface will generally be of a more diffuse nature. For these systems, the collector should be removed a further distance from the photoreceptor and the slit through which the incident light enters the cavity should be modified to permit a greater amount of light to enter in areas not adjacent a photodetector. FIG. 8 shows a view of the FIG. 2 collector looking at slit 109 from the photoreceptor surface. FIG. 9 shows the same perspective view of slit 109 for the FIG. 5 embodiment. (The entrance slit has been omitted in FIGS. 8 or 9 for ease of description).

Although the invention has been described with relation to scanning of a photoreceptor surface having a toned image thereon, it is equally applicable to systems where the information content of original documents is scanned directly. Other modifications may be made to the embodiments disclosed herein without departing from the principles of the invention. For example, in the FIGS. 2 and 3, embodiments, fewer or more photodetectors may be used depending on system requirements. Similarly, a scan detector may be placed at the opposite end of the collector in the FIG. 5 embodiment. The photodetectors may be either photodiodes or PMT detectors.

What is claimed is:

1. In a flying spot scanning system adapted to raster scan an information bearing surface, a light collector for collecting light reflected from said scanned surface, said light collector comprising:
   a generally cylindrical, hollow integrating cavity having at least one longitudinally extending slit therein, said cavity disposed relative to said scanned surface so that light reflected from said scanned surface enters said cavity through said slit,
   at least one photodetector element placed within said cavity to produce a signal level representative of the scanned information; and
   apodizing means to improve the uniformity of said signal level.

2. The scanning system of claim 1 wherein said integrating cavity has a first entrance slit aligned with a second exit-re-entry slit disposed adjacent said scanned surface wherein a scanning beam enters the cavity through said first slit, passes through said second slit and is scattered from said surface back into said cavity.

3. The scanning system of claim 2 wherein a plurality of photodetectors are located along the inside cavity wall and wherein said apodizing means is a variable density longitudinally extending area of the cavity wall disposed parallel to said detectors and to said entrance slit and in a location to directly receive the first component of light reflected from said surface, said strip density selected to provide an essentially uniform signal response from said photodetectors.

4. The scanning system of claim 3 wherein said variable density strip comprises a photographically produced strip having the desired density variation, said photographic strip affixed to a reflecting material on the cavity wall.

5. The scanning system of claim 1 wherein said apodizing means comprises a variable transmission filter disposed over said slit, said filter designed to provide an essentially uniform signal response from said photodetector.

6. The scanning system of claim 3 wherein said variable density strip comprises a coating of paint, said coating varying to provide desired density variation.

7. The scanning system of claim 1 wherein said photodetector element is a single photodetector placed at one end of said collector.

8. The spot scanning system of claim 7 wherein said apodization means is a variable density longitudinally extending area of the cavity wall disposed to receive said first component of light reflected from said surface, said strip density selected to provide an essentially uniform signal response from said photodetector.

9. The spot scanning system of claim 7 wherein the apodization means includes means to alter the incident light beam intensity with time to provide an essentially uniform signal response from said photodetector.

10. The spot scanning system of claim 7 wherein the apodization means includes means to alter the output signal level of said photodetector to provide an essentially uniform signal response from said photodetector.

11. The scanning system of claim 7 wherein the apodization means includes a field lens of appropriate focal length placed in front of the photodetector and adapted to condense and direct rays which originate from the ends of the cavity opposite the photodetector onto the photodetector while having relatively little effect on rays originating near the detector end of the cavity.

12. The scanning system of claim 1 wherein said information bearing surface is a photoreceptor having thereon a toned image pattern.

13. The scanning system of claim 1 wherein said information bearing surface is a document having an information pattern thereon.

14. The scanning system of claims 3 or 8, wherein said cavity includes highly reflective end portions adjacent said exit-re-entry slit, said end portions lying in the scan beam path whereby the high signal level generated from the photodetectors can be used as start and end of scan signals.

15. The scanning system of claim 14 wherein said end portions are encoded with a bar pattern of fixed frequency which, when scanned, result in a periodic photodetector response which can be used to determine scan velocity and position.

16. The scanning system of claim 13 wherein said slit is adapted to permit a greater amount of light to enter said cavity in inverse proportion to the location of the photodetectors.

17. A light collector comprising
a generally cylindrical, hollow integrating cavity having at least one longitudinally extending slit thereon, said cavity disposed relative to a light reflecting surface so that reflected light enters said cavity through said slit;
at least one photodetector positioned so as to produce a signal level representative of said light reflected into said cavity, and
apodizing means to improve the uniformity of said signal level.

* * * * *

Disclaimer

4,321,630.—*Charles J. Kramer,* Pittsford, N.Y. LINEAR INTEGRATING CAVITY LIGHT COLLECTOR. Patent dated Mar. 23, 1982. Disclaimer filed Sept. 24, 1982, by the assignee, *Xerox Corp.*

Hereby enters this disclaimer to claims 1, 2, 3, 5, 6, 7, 8, 12, 13 and 17 of said patent.

[*Official Gazette November 16, 1982.*]